United States Patent [19]

Franzini

[11] Patent Number: 5,785,229
[45] Date of Patent: Jul. 28, 1998

[54] POWDER ACTUATED CONNECTING TOOL FIRING MECHANISM ADAPTER

[75] Inventor: John R. Franzini, Nashua, N.H.

[73] Assignee: Framatome Connectors USA, Inc., Fairfield, Conn.

[21] Appl. No.: 79,338

[22] Filed: Jun. 18, 1993

[51] Int. Cl.$^6$ ................................................ B25C 1/14
[52] U.S. Cl. ........................................ 227/10; 173/202
[58] Field of Search ........................... 227/8, 9, 10, 11; 173/202, 203, 118

[56] References Cited

U.S. PATENT DOCUMENTS

| 0,702,499 | 6/1902 | Smith | 173/202 |
|---|---|---|---|
| 1,458,961 | 6/1923 | Williams | 173/202 |
| 1,720,318 | 7/1929 | Chisholm | 173/202 |
| 2,104,214 | 12/1938 | Temple, Jr. | 164/56 |
| 2,133,364 | 10/1938 | Temple, Jr. | 140/113 |
| 2,140,338 | 12/1938 | Temple, Jr. | 164/47 |
| 2,454,528 | 11/1948 | Temple | 164/47 |
| 2,724,116 | 11/1955 | Termet | 1/44.5 |
| 3,473,718 | 10/1969 | Wackrow | 227/10 |
| 3,816,951 | 6/1974 | Larsson | 227/10 |
| 4,077,556 | 3/1978 | Buchel | 227/10 |
| 4,196,834 | 4/1980 | Beton | 227/10 |
| 4,375,269 | 3/1983 | Bosch et al. | 227/10 |
| 4,377,991 | 3/1983 | Liesse | 227/10 |
| 4,686,786 | 8/1987 | Termet | 42/1.12 |
| 4,945,730 | 8/1990 | Laney | 60/635 |
| 5,119,634 | 6/1992 | Berry et al. | 60/632 |

*Primary Examiner*—Rinaldi I. Rada
*Assistant Examiner*—Boyer Ashley
*Attorney, Agent, or Firm*—Perman & Gree, LLP

[57] ABSTRACT

An adapter is provided that includes a housing, a striker, a spring, a lever, and a hook. The striker is movably mounted in the housing and biased by the spring towards a firing position with a front end extending into an aperture at the front of the housing. The lever is pivotally connected to the exterior of the housing and the hook. The hook extends through an aperture in the housing and is connected to the striker such that movement of the lever will move the striker. The front end of the housing has a connector for connecting the housing to a rear end of a powder actuated connecting tool.

21 Claims, 3 Drawing Sheets

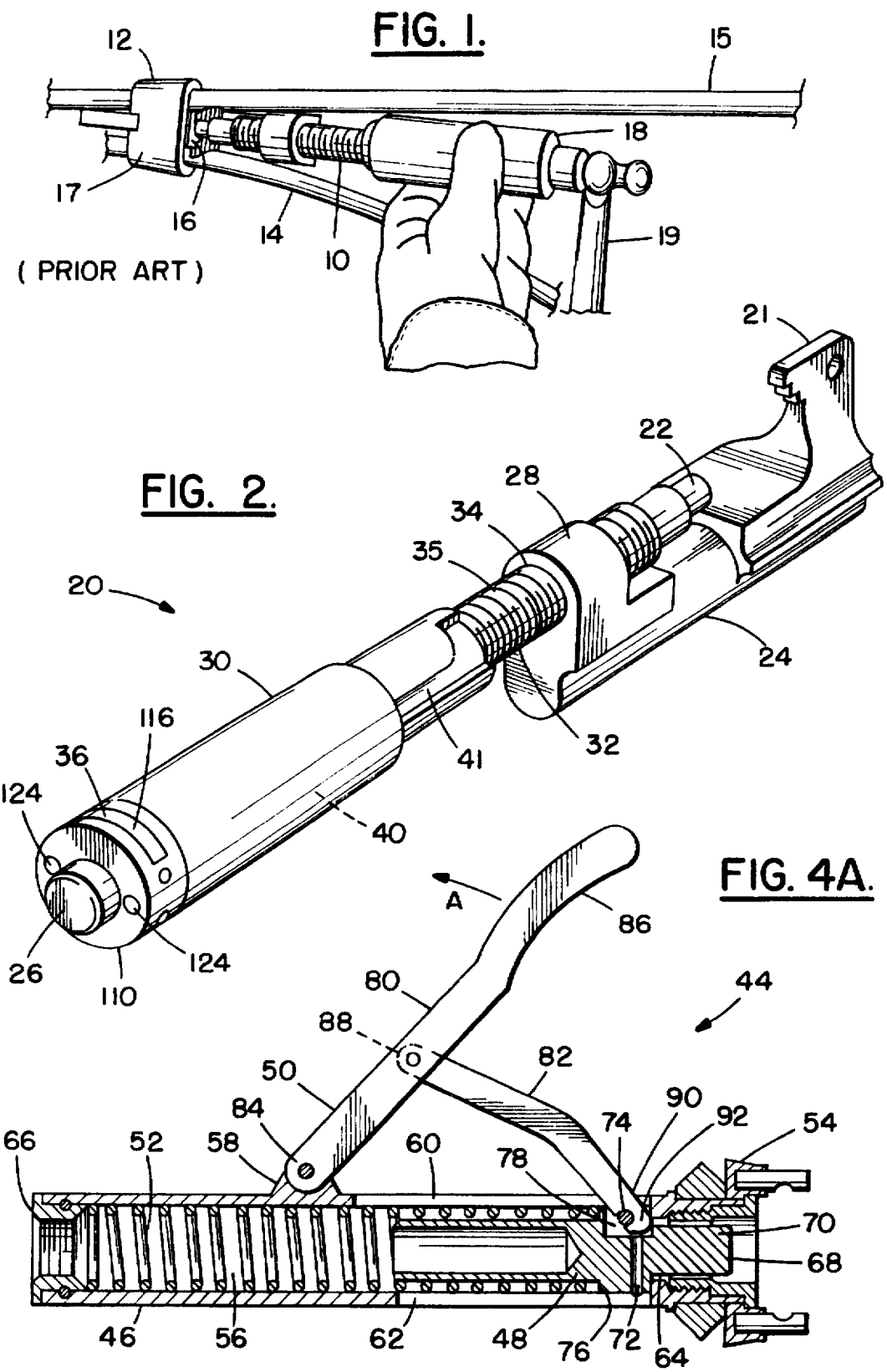

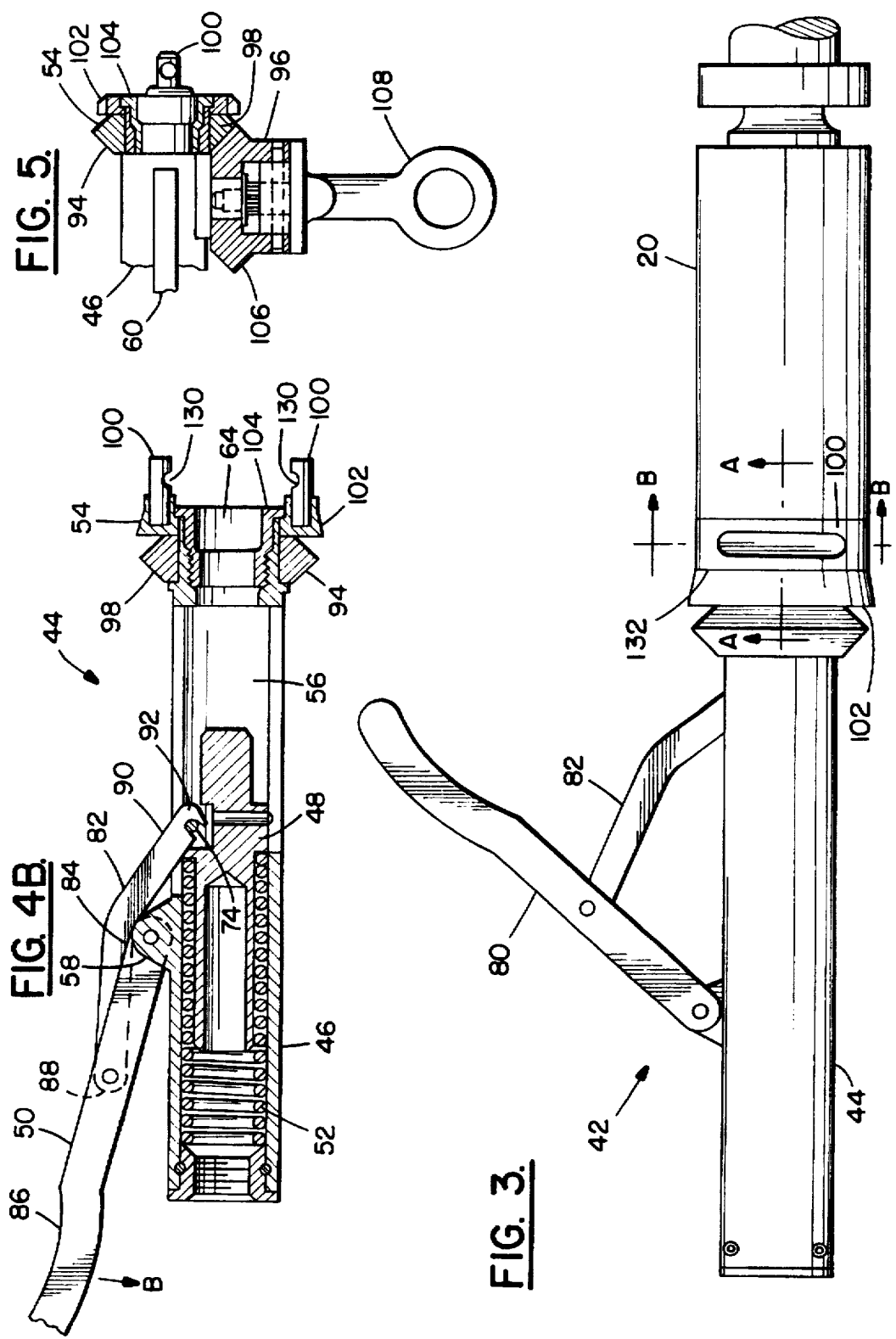

POWDER ACTUATED CONNECTING TOOL FIRING MECHANISM ADAPTER

BACKGROUND OF THE INVENTION

1. Field of the Invention

The present invention relates to powder actuated connecting tools and, more particularly, to a firing mechanism adapter for firing a powder-actuated connecting tool.

2. Prior Art

U.S. Pat. No. 4,945,730 discloses an explosively operated tool for connecting an electrical connector to two electrical wires. The tool uses a cartridge having a powder propellant to drive the tool upon striking a rear end of the tool with a hammer. U.S. Pat. No. 2,454,528 discloses a cable cutter that uses an explosive cartridge. A cocking lever is used to load the firing pin. A spring is provided to drive the firing pin forward. U.S. Pat. No. 2,140,338 discloses an explosively operated cable cutter with a detent and spring that control the firing pin. Other related U.S. patents include U.S. Pat. Nos. 5,119,634; 4,196,834; 2,133,364; 2,140,214; 2,724,116 and 4,686,786.

SUMMARY OF THE INVENTION

In accordance with one embodiment of the present invention, a powder actuated connecting tool firing mechanism adapter is provided comprising a housing, a striker, a cocking and trigger assembly, a spring, and means for connecting the housing to an end of a powder-actuated connecting tool. The striker is movably connected to the housing. The cocking and trigger assembly has a first lever arm movably connected to the housing and, a second arm having a first end connected to the first lever arm and a second end for engaging and moving the striker. The spring biases the striker towards a firing position.

In accordance with another embodiment of the present invention, a powder actuated connecting apparatus is provided comprising a hammer initiated powder actuated connecting tool, and an adapter. The adapter is fixedly, but rotatably connected to a hammer end of the tool. The adapter has a housing, a striker movably connected to the housing and means for moving the striker between firing and cocked positions.

In accordance with another embodiment of the present invention, a firing mechanism adapter is provided for a hammer initiated powder actuated connecting tool. The adapter comprises a housing, a striker, a spring, and a cocking and trigger assembly. The striker is movably connected to the housing. The spring biases the striker towards a firing position. The cocking and trigger assembly is connected to the housing and includes a first lever arm pivotally connected to the housing and a second arm pivotally connected to the first arm.

BRIEF DESCRIPTION OF THE DRAWINGS

The foregoing aspects and other features of the invention are explained in the following description, taken in connection with the accompanying drawings, wherein:

FIG. 1 is a perspective view showing a prior art tool in use for installing an electrical connector.

FIG. 2 is a perspective view of a connecting tool similar to the tool shown in FIG. 1, but incorporating features of the present invention.

FIG. 3 is a partial side elevational view of an apparatus incorporating features of the present invention and having the tool show in FIG. 2.

FIG. 4A is a schematic sectional view of the adapter shown in connection to the tool in FIG. 3 to form the apparatus.

FIG. 4B is a schematic sectional view of the adapter shown in FIG. 4A in a cocked or loaded position.

FIG. 5 is a schematic partial sectional view of the connector used at the front of the adapter shown in FIGS. 4A and 4B.

DETAILED DESCRIPTION OF THE INVENTION

Figure 6A:
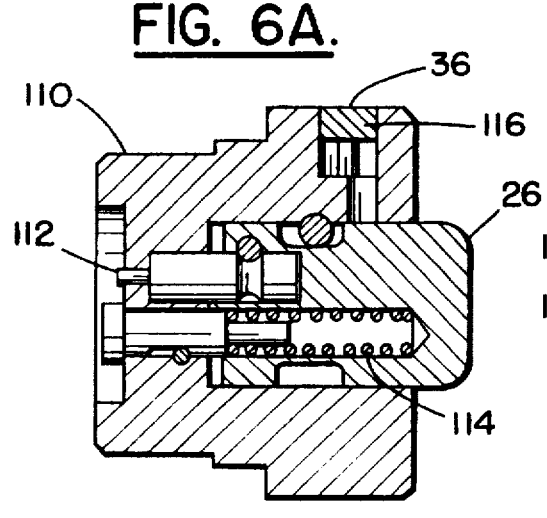
FIG. 6A is a sectional view of the rear end of the tool shown in FIG. 3 taken along line A—A.

Referring to FIG. 1, there is shown a perspective view of a tool 10 known in the prior art being used to install an electrical connector 12. The tool 10 is an explosively operated tool described in U.S. Pat. No. 4,722,189 which is hereby incorporated by reference in its entirety. The tool 10 is used for connecting a branch or tap wire 14 to a main power line 15. The connector 12 includes a wedge connector 16 and a C-shaped sleeve 17. The tool 10 uses a powder cartridge to drive the wedge connector 16 into the sleeve 17 sandwiching the wire 14 and line 15 against opposite ends of the sleeve 17. The tool is fired by a user striking the rear end 18 of the tool 10 with a hand-held hammer 19.

Referring now to FIG. 2, there is shown a perspective view of a tool 20 incorporating features of the present invention. Although the present invention will be described with reference to the single embodiment shown in the drawings, it should be understood that the present invention can be embodied in various different alternative forms and in combination with various different features. In addition, any suitable size, shape or type of elements or materials could be used.

The tool 20 is substantially similar to the tool 10 shown in FIG. 1. The tool 20 is a hammer initiated powder actuated connecting tool. The tool 20 includes an anvil 21 and a ram 22 which are adapted to engage a connector and a wedge in position with two cables such that the explosively powered ram can drive the wedge into its final position. The tool 20 further includes a base member or frame 24 for mounting the anvil 21 and a breech action assembly 30 connected thereto. The assembly 30 is fitted through a support sleeve 28 at an end of the frame 24 to position the power ram 22 along the longitudinal axis of the tool in general alignment with the anvil 21. The breech action assembly 30 includes a main breech member 32 inserted into the support sleeve 28 for adjustment with respect to the anvil by means of a threaded connection 34 and for advancing the power ram and the anvil into engagement with a connector workpiece during the process of establishing the power line connection. The main breech member 32 is threaded at 35 along its forward surface and includes a longitudinal axial bore for receiving the power ram 22 through its muzzle and defining a firing chamber 40 for receiving a power booster cartridge (not shown) at its breech end. The main breech member 32 terminates in the breech action assembly 30 which accommodates the firing chamber lying along the longitudinal axis of the tool. The main breech member 32 is generally cylindrical and includes on its outer surface a slot 41 having longitudinally and circumferentially extending segments for receiving and guiding the breech action assembly 30. The breech action assembly 30 is slidably fitted over the main breech member 32 for loading, firing, and extracting booster cartridge cases in the firing chamber and for disarming the tool whenever it is removed from an unfinished workpiece without the power cell being detonated. The breech action assembly 30 is generally cylindrical with a knurled outer surface, and a window or breech opening for inserting cartridges into the firing chamber 40. The rear end of the tool 20 includes a striker 26 and a connector 36. The striker 26 is adapted to be hit by a hand-held hammer and causing a firing pin to strike a cartridge inside the firing chamber 40. The connector 36 is used to allow an adapter to be connected to the rear end of the tool 20. The adapter will be described in detail below.

Normal operation of the tool 20 is relatively simple. A booster cartridge is placed in the firing chamber 40 and the breech action assembly 30 is closed and locked in position. A connector sleeve, wedge and two cables are then located and positioned at the anvil 21. The breech action assembly 30 is then rotated by the operator relative to the frame 24. This causes the threads 35 and 34 of the main breech member 32 and the support sleeve 28 to move the breech action assembly 30 towards the anvil 21. The operator stops rotating the assembly 30 when the anvil 20 and front end of ram 22 sandwich the connector sleeve, conductors, and wedge therebetween. The operator then merely strikes the striker 26 with a hand held tool, such as a hand-held hammer. This causes a firing pin to ignite a primer of the booster cartridge to thereby fire the cartridge. Expanding gases from the cartridge act against the rear end of the ram 22 to thereby drive the ram 22 towards the anvil 21. The force exerted by the ram 22 is sufficient to drive the wedge into the connector sleeve with the cables therebetween in a very tight electrical and mechanical connection. Correspondingly, the force exerted by the connector sleeve, wedge and cables, by their connection, to the ram 22 causes the ram 22 to be stopped from moving forward when the connection is complete. Once the connection is completed, the operator then merely unscrews the assembly 30, removes the completed connection, removes the spent booster cartridge, and resets the ram 22 back to its starting position. The tool 20 can now be used for another connection.

Referring now also to FIG. 3, there is shown a partial elevational view of a powder actuated connecting apparatus 42. The apparatus 42 generally comprises the hammer initiated powder actuated connecting tool 20 and an adapter 44. The adapter 44 is fixedly connected to the rear end of the tool 20. Referring also to FIGS. 4A, 4B and 5, the adapter 44 will be described.

The adapter 44 generally comprises a housing 46, a striker 48, a cocking and trigger assembly 50, a spring 52, and a connector 54. The housing 46 is preferably comprised of metal and has a general tube shape. The housing 46 generally includes a center channel 56, a pivot mounting post 58, first and second apertures 60,62 that extend through the housing into the channel 56 and have generally slot-like shapes, and a front aperture 64 at a front end of the housing. An end plug 66 is attached to the rear end of the housing 46 to contain the spring 52 inside the channel 56. The striker 48 is preferably comprised of metal and includes a front striking face 68 at a front end 70, an anti-rotation pin 72, a loading pin 74, and a spring ledge 76. A recessed area 78 surrounds the loading pin 74. An end of the anti-rotation pin 72 rides in the second aperture 62 to prevent the striker 48 from axially rotating in the channel 56. This keeps the loading pin 74 aligned beneath the first aperture 60. The cocking and trigger assembly 50 generally comprises a first lever arm 80 and a second hook arm 82. The first arm 80 has a first end 84 pivotally connected to the pivot mounting post 58 and a second handle end 86. The second arm 82 has a first end 88 pivotally connected to the first arm 80 and a second end 90. The second end 90, in the embodiment shown, has a hook 92 that is adapted to be positioned into the recessed area 78 of the striker 48 and hook onto the loading pin 74. The second end 90 extends through the first aperture 60 to access the striker 48. The spring 52 is a coil spring with a rear end located against the end plug 66 and a front end located against the spring ledge 76 of the striker 48.

The connector 54 generally comprises a driven gear assembly 94 and a drive gear assembly 96. The driven gear assembly 94 generally comprises a driven gear 98 and two spaced pins 100. The driven gear 98 is rotatably mounted on the front end of the housing 46 coaxial with the center axis of the housing 46. The pins 100 extend in front of the adapter offset from the center axis of the housing 46. A pin retainer 102 fixedly connects the pins 100 to the driven gear 98 such that the pins 100 are rotated about the center axis of the housing 46 when the driven gear is rotated on the housing. A driven gear retainer 104 is connected to the front of the housing 46 to retain the driven gear assembly 94 on the housing. The drive gear assembly, shown only in FIG. 5, has a drive gear 106 and a hotstick connector 108. The drive gear 106 is fixedly connected to the housing 46 for rotation about the drive gear's center axis. The drive gear 106 is operably connected to the driven gear 98 such that rotation of the drive gear 106 rotates the driven gear 98 about the center axis of the housing 46. Thus, rotation of the drive gear 106 rotates the driven gear assembly 94 while the housing 46 remains relatively stationary. The hotstick connector 108 is fixedly connected to the drive gear 106 such that the drive gear assembly can be operably rotated by a user with the use of a hotstick.

Figure 6B:
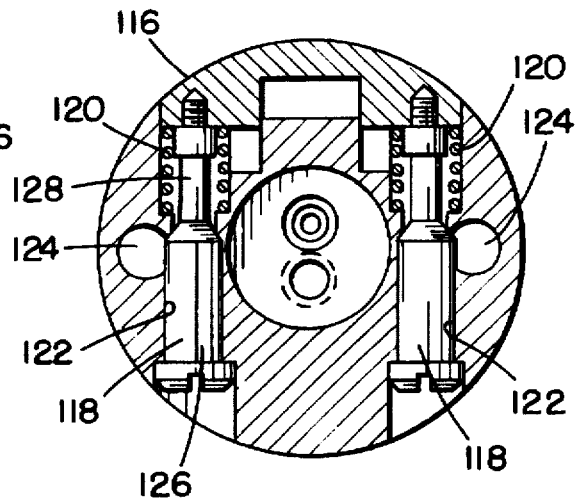
FIG. 6B is a sectional view of the rear end of the tool shown in FIG. 3 taken along line B—B.

Referring now also to FIGS. 6A and 6B, the connection of the adapter 44 to the tool 20 will be described. As noted above, the tool 20 is substantially similar to the prior art tool 10. However, one significant difference is in the rear end of the tool 20. The rear end of the tool 20 has a breech plug 110 that includes the firing pin 112, the striker 26, and the connector 36. The striker 26 is biased by a spring 114 in a rearward extending position. When the striker 26 is struck by a hand-held hammer it can drive the firing pin 112 forward to initiate a powder cartridge. The connector 36 includes bar 116, two locking pins 118 connected to the bar 116, and two springs 120. The bar 116 is movably located in a channel of the breech plug 110. The locking pins 118 are movably located in holes 122 in the breech plug 110 transverse to the center axis of the tool 20. The breech plug 110 also includes two holes 124 adapted to receive the pins 100 of the adapter 44. The holes 124 have openings at the rear end of the breech plug 110 and intersect, at least partially, the holes 122.

When the bar 116 is pushed down into its channel, the springs 120 are compressed and the locking pins 118 are moved. The locking pins 118 each have a fat section 126 and a thin section 128. When the bar 116 is pushed down, the fat sections 126 are moved out of the junction between the holes 122 and 124. The pins 100 on the adapter 44 have recessed areas 130 suitably sized and shaped to receive the portions of the fat sections 126 in the junction of the holes 122 and 124.

In order to connect the adapter 44 to the tool 20, the pins 100 are aligned in front of the holes 124. The user then presses down on the bar 116. This moves the locking pins 118 out of the path of the insertion of the pins 100 into the holes 124. The pins 100 are then fully inserted into the holes 124 and the bar 116 is released. The locking pins 118 move back into the junction with the fat sections 126 being received in the recessed areas 130 of the pins 100. The tool 20 and adapter 44 are thus fixedly connected to each other. The extended end of the striker 26 is received in the aperture 64. In the preferred embodiment shown in FIG. 3, the adapter 44 is welded to the tool 20 at the joint 132 between the breech plug 110 and the pin retainer 102. In alternate embodiments, any suitable type of connection of the adapter to the tool could be provided.

As noted above the tool 20, when used without the adapter 44, can be used the same as the prior art tool 10. However, the present invention also allows the adapter 44 to be attached to the tool 20 such that the tool 20 can be fired without having to use a hand-held hammer, such as hammer 19 shown in FIG. 1. When the adapter 44 is attached to the tool 20, the tool 20 can be fired by merely cocking and then releasing the cocking and trigger assembly 50.

Figure 4C:
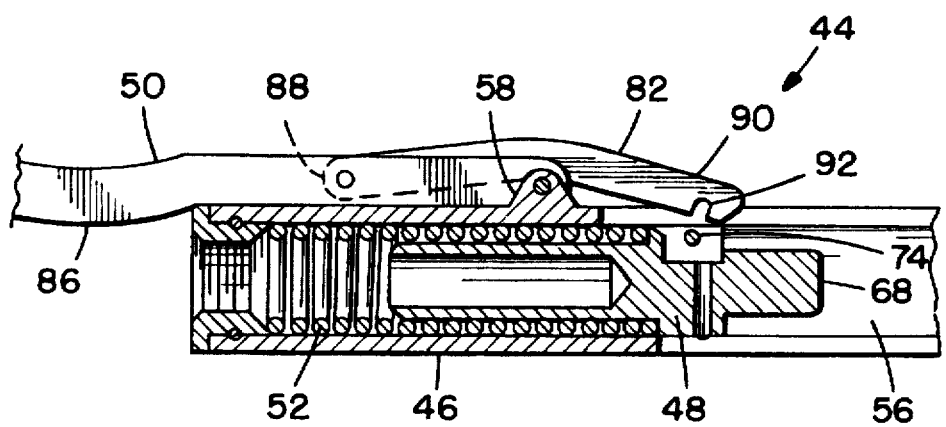
FIG. 4C is a schematic sectional view of the adapter shown in FIGS. 4A and 4B in a striker releasing or firing position.

FIG. 4A shows the adapter 44 in its uncocked position. The front end 70 of the striker 48 projects into the front aperture 64 of the housing 46; biased by the spring 52. A user can cock the striker 48 back to the cocked position shown in FIG. 4B by manually moving the lever arm 80 in a rearward direction as shown by arrow A. As the lever arm 80 is moved back it pivots at its first end 84 on the housing 46. The hook arm 82 is pulled back by the lever arm 80. Because the hook 92 is connected to the loading pin 74, the striker 48 is moved back in the center channel 56. The spring 52 is compressed by the rearward movement of the striker 48. In the cocked position shown in FIG. 4B, the cocking and trigger assembly 50 is able to keep the striker 48 in its cocked position until a force is applied to the handle section 86, as illustrated by arrow B, to move the lever arm a predetermined amount, such as about 10°. The hook arm 92 rests on the pivot mounting post 58 in this cocked position. As the handle section 86 is moved from the cocked position shown in FIG. 4B to the striker releasing position shown in FIG. 4C, the first end 84 of the hook arm 92 is moved down, the hook arm 92 pivots on the pivot mounting post 58, and the second end 90 is moved up. As the second end 90 is moved up, the hook 92 becomes disengaged from the loading pin 74. Thus, with the cocking and trigger assembly 50 no longer retaining the striker 48, the striker 48 is then propelled forward by the spring 52 such that the striking face 68 strikes the striker 26 of the tool 20. The striker 26 then causes the firing pin 112 to impact the cartridge to fire the tool 20. In alternate embodiments, other types of cocking and trigger assemblies or mechanisms could be provided.

One of the principal advantages of the present invention is the fact that a user no longer needs to use a hammer to fire the connecting tool. The adapter 44 allows the connecting tool to be fired by cocking and releasing the striker 48. This also helps to insure that the striker 26 will be hit with sufficient force to cause the cartridge to be fired. In the prior art tool 10, if the user didn't use sufficient force with the hammer 19, the tool 10 would not fire. Another principal advantage of the present invention is the fact that the apparatus 42 is easier to use at extended distances from the user. In situations where one of the lines or wires being connected is live or hot (i.e.: has electricity running through it) it is common practice to use long working polls known as hotsticks to keep the user a safe distance from the wires. The hotsticks are made of non-conductive material such as wood or polymers and, have suitable lengths such as six to twenty feet. Needless to say, attaching a hammer to the end of a hotstick and then attempting to hit the rear end of the tool 10 six to twenty feet away with sufficient force to fire the tool 10 is not an easy task. By use of the adapter 44, a user can cock the apparatus 42 prior to putting it in place and, once in place, merely push up or pull down on the handle section 86 with a hotstick. When the hook arm 82 is disengaged from the striker 48, as the lever arm 80 is moved, the striker 48 is automatically propelled forward to fire the tool 20. The use of the adapter 44 obviously makes it easier to fire the connecting tool at extended distances from the user.

Another feature of the present invention is in regard to the connector 54. Once the adapter 44 is cocked and the apparatus 42 is being moved into place, the user does not want the lever arm 80 to be accidentally moved by items such as tree branches. Therefore, the connector 54 allows the housing 46 and cocking and trigger assembly 50 to remain constantly oriented relative to the user, but allows the tool 20 to be axially rotated about the center axis of the apparatus 42. Rotating the hotstick connector 108 rotates the drive gear 106. This rotates the driven gear assembly 94. Because the pins 100 are in the holes 124, the entire tool 20 is rotated when the driven gear assembly 94 is rotated. Thus, the tool 20 can be repositioned without having to reposition the adapter 44 and risking inadvertent accidental triggering of the assembly 50. In alternate embodiments other types of means to repositionally connect the adapter to the tool could be provided or, the adapter could be stationarily connected to the tool. In a preferred embodiment, the apparatus 42 is sold as a single unit. However, the tool 20 can obviously be purchased separately from the adapter 44. The adapter 44 can then be purchased at a later time if desired.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A firing mechanism adaptor comprising:
   a housing;
   a striker movably connected to the housing;
   a cocking and trigger assembly having a first lever arm, movably connected to the housing and a second arm having a first end connected to the first lever arm and a second end for engaging and moving the striker;
   a spring biasing the striker towards a firing position; and
   means for connecting the housing to an end of a powder actuated connecting tool such that the striker is suitably positioned to strike a connecting tool striker at the end of the powder actuated connecting tool.

2. An adapter as in claim 1 wherein the second arm is pivotally connected to the first arm.

3. An adapter as in claim 1 wherein the striker is located in a channel of the housing and the second arm extends through an aperture in the housing into the channel.

4. An adapter as in claim 3 wherein the striker and housing include means for preventing the striker from axially rotating in the channel.

5. An adapter as in claim 1 wherein the means for connecting the housing to the tool includes a connector at a front end of the housing.

6. An adapter as in claim 5 wherein at least a portion of the connector is rotatably connected to the front end coaxially with a center axis of the housing.

7. An adapter as in claim 6 wherein the connector includes a driven gear assembly and a drive gear connected to the housing for rotating the driven gear assembly relative to the housing.

8. An adapter as in claim 7 further comprising a hotstick connector connected to the drive gear for rotating the drive gear.

9. An adapter as in claim 7 wherein the driven gear assembly has a driven gear and two spaced pins, the pins extending at a front of the adapter and being connected to the driven gear such that the adapter pins are rotated about a center axis of the adapter when the driven gear is rotated.

10. A powder actuated connecting apparatus comprising:

a hammer initiated powder actuated connecting tool; and an adaptor rotatably connected to a hammer end of the tool, the adapter having a housing, a striker movably connected to the housing, and means for moving the striker between firing and cocked positions.

11. An apparatus as in claim 10 wherein the adapter is welded to the tool.

12. An apparatus as in claim 10 wherein the adapter has a connector at a front end of the housing that fixedly connects the housing to the hammer end of the tool.

13. An apparatus as in claim 12 wherein the connector includes a driven gear assembly and a drive gear connected to the housing for rotating the driven gear assembly.

14. An apparatus as in claim 13 wherein the adapter further includes a hotstick connector connected to the drive gear such that a hotstick can rotate the drive gear to rotate the tool relative to the housing of the adapter.

15. An apparatus as in claim 12 wherein the connector has two spaced pins that are positioned in receiving holes in the hammer end of the tool.

16. An apparatus as in claim 15 wherein the tool has a lock at its hammer end for locking the pins in the receiving holes.

17. A firing mechanism adapter for a hammer initiated powder actuated connecting tool, the adaptor comprising:

a housing;

a striker movably connected to the housing;

a spring biasing the striker towards a firing position;

a cocking and trigger assembly connected to the housing, the assembly having a first lever arm pivotally connected to the housing and a second arm pivotally connected to the first arm; and means for rotatably connecting the housing to an end of the connecting tool.

18. An adapter as in claim 17 wherein the second arm extends through an aperture in the housing and is pivotally connected to the striker.

19. An adapter as in claim 17 wherein the means for connecting comprises a connector at a front end of the housing.

20. An adapter as in claim 19 wherein the connector includes a driven gear assembly and a drive gear.

21. An adapter as in claim 19 wherein the housing has an aperture at its front end and the striker projects into the aperture in its firing position.

\* \* \* \* \*